United States Patent
Mukai (12)

(10) Patent No.: US 6,462,499 B2
(45) Date of Patent: Oct. 8, 2002

(54) TEACHING DEVICE FOR ROBOTS, ROBOT USING SAME, AND ROBOT OPERATING METHOD

(75) Inventor: Yasushi Mukai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/820,020

(22) Filed: Mar. 28, 2001

(65) Prior Publication Data

US 2001/0045809 A1 Nov. 29, 2001

(30) Foreign Application Priority Data

Mar. 28, 2000 (JP) ........................................ 2000-088014

(51) Int. Cl.[7] .............................................. G05B 19/04
(52) U.S. Cl. ............................ 318/568.21; 318/568.16; 318/568.18
(58) Field of Search ............................ 318/567, 568.11, 318/568.12, 568.14, 568.16, 568.18, 568.21

(56) References Cited

U.S. PATENT DOCUMENTS

| | | | |
|---|---|---|---|
| 4,131,033 A | * 12/1978 | Wright et al. .................. 74/553 |
| 4,511,985 A | * 4/1985 | Inaba et al. .................. 364/513 |
| 5,608,618 A | * 3/1997 | Kosaka et al. ......... 364/167.01 |
| 5,980,082 A | * 11/1999 | Watanabe et al. ............ 364/191 |
| 6,005,299 A | * 12/1999 | Hengst ...................... 307/10.1 |
| 6,128,006 A | * 10/2000 | Rosenberg et al. ......... 345/163 |
| 6,154,201 A | * 11/2000 | Levin et al. ................ 345/184 |

* cited by examiner

Primary Examiner—Robert E. Nappi
Assistant Examiner—Rina I. Duda
(74) Attorney, Agent, or Firm—RatnerPrestia

(57) ABSTRACT

The number of operation keys is decreased, realizing cost reduction and miniaturization of a teaching device. Further, the working efficiency and operational safety are considerably improved. Also, the operations of the robot ranging from delicate positioning and high-speed continuous operation can be readily controlled by serial manipulations. The present invention includes (a) a plurality of operation keys to designate one out of a plurality of operation coordinates of the robot arm, and (b) a controller which controls the operation of the robot arm. The controller has a function to control the robot arm so that the robot arm is positioned on the designated operation coordinates and also a function to control the operation speed of the robot arm. The controller includes a jog dial disposed in a manner such that the jog dial can be rotated and pushed. When the jog dial is rotated in a state that the jog dial is not pushed, the position of the robot arm is controlled by the rotation of the jog dial, and when the jog dial is rotated in a state that the jog dial is pushed, the operation speed of the robot arm is controlled by the rotation of the jog dial.

26 Claims, 2 Drawing Sheets

TEACHING DEVICE FOR ROBOTS, ROBOT USING SAME, AND ROBOT OPERATING METHOD

FIELD OF THE INVENTION

The present invention relates to a teaching device for robots, a robot using the teaching device, and a method of operating a robot.

BACKGROUND OF THE INVENTION

Conventionally, a robot is operated by manipulating a plurality of keys disposed in a teaching device (teaching pendant).

In this case, the basic keys to operate the robot comprise a plurality of keys including two keys, normal and reverse keys, disposed on the respective operation coordinates of a plurality of operation coordinates, and an operation permit key to prevent accidental operation of the robot due to wrong manipulation of an operation button. In such conventional robot, the operator presses an operation key corresponding to the desired direction while pressing the operation permit key, and thereby, the robot is operated in a continuous operation mode.

In that case, when the robot is widely moved, for example, by dozens of centimeters in distance, it is necessary to operate the robot at a high speed in order to carry out the job efficiently. On the contrary, when the robot approaches an object and is required to make a narrow move, there is a danger of accidents such as collision between the robot and the object if the robot is still operated at a high speed. That is, it is necessary to operate the robot at a low speed.

In order to solve such problem, there is separately provided a speed selector key which can change the speed in multiple stages. The operator is required to frequently change the speed by manipulating the speed selector key.

And, when the robot further approaches the object and is required to make a delicate move, it becomes extremely difficult for the operator to adjust the position of the robot in continuous operation. Accordingly, such delicate adjustment is made, every manipulation of the key, by selecting a mode such as a pitch operation (or pulse jog) mode in which the robot is operated only by a preset moving amount.

In that case, when specially accurate positioning is needed, the preset moving amount in the above pitch operation is set to about 0.1 mm. However, when the robot is moved by 10 mm in a state of such setting, it is necessary to manipulate the operation key as many as 100 times.

In order to avoid such frequent manipulation of the operation key, a moving amount selector key is installed to change over the moving amount in pitch operation, and the robot is operated by frequently manipulating the moving amount selector key.

However, in the above configuration of the prior art, frequent changing of the speed makes the manipulation complicated. Moreover, the operator is liable to make mistakes in selecting the speed.

Further, the operator has to carry out the job frequently changing the mode to and from the continuous operation and pitch operation while still frequently selecting the operation speed and moving amount in the respective modes. Accordingly, these operations make the manipulation complicated, worsening the working efficiency, and also causes generation of faulty manipulation.

SUMMARY OF THE INVENTION

The present invention is a teaching device for robots, which serves to set the operating position and speed of a robot arm having a plurality of operation coordinates.

The teaching device comprises:
(a) a plurality of operation keys which designate one of the plurality of operation coordinates of the robot arm; and
(b) a controller which controls the operation of the robot arm,
wherein the controller has a function to control the robot arm so that the robot arm is positioned on the designated operation coordinate, and also a function to control the operation speed of the robot arm.

The controller comprises a jog dial disposed in a manner such that the jog dial can be either pushed or pulled at least and rotated.

The robot section (robot arm) performs one of the following operations:
(i) when the jog dial is rotated in a state that the jog dial is neither pushed nor pulled, the position of the robot arm is controlled by the rotation of the jog dial, and when the jog dial is rotated in a state that the jog dial is either pushed or pulled at least, the operation speed of the robot arm is controlled by the rotation of the jog dial.
(ii) when the jog dial is rotated in a state that the jog dial is neither pushed nor pulled, the operation speed of the robot arm is controlled by the rotation of the jog dial, and when the jog dial is rotated in a state that the jog dial is either pushed or pulled at least, the position of the robot arm is controlled by the rotation of the jog dial.

A robot of the present invention comprises the above-mentioned teaching device and robot arm.

A robot operating method of another invention is a method of operating a robot comprising a teaching device and a robot arm,
Wherein the teaching device comprises a controller having a jog dial and a plurality of operation keys, and the robot arm moves on a plurality of operation coordinates.

The robot operating method comprises:
(a) a step of selecting and manipulating one operation key from a plurality of operation keys, and selecting the operation coordinates of the robot arm; and
(b) a step of moving the robot arm to the predetermined position through one step of
(i) a step of controlling the position of the robot arm by rotating the jog dial in a state that the jog dial is neither pushed nor pulled, and a step of controlling the operation speed of the robot arm by rotating the jog dial in a state that the jog dial is either pushed or pulled at least;
(ii) a step of controlling the operation speed of the robot arm by rotating the jog dial in a state that the jog dial is neither pushed nor pulled, and a step of controlling the position of the robot arm by rotating the jog dial in a state that the jog dial is either pushed or pulled at least.

With this configuration, the number of operation keys can be decreased, making it possible to realize cost reduction and to miniaturize the teaching device. Further, the working efficiency and the operational safety may be considerably improved. In addition, it is possible to readily control the operations of the robot ranging from delicate positioning to high-speed continuous operation by serial manipulations. As a result, the working efficiency and the operational safety can be greatly enhanced.

DESCRIPTION OF THE REFERENCE NUMERALS

Figure 1:
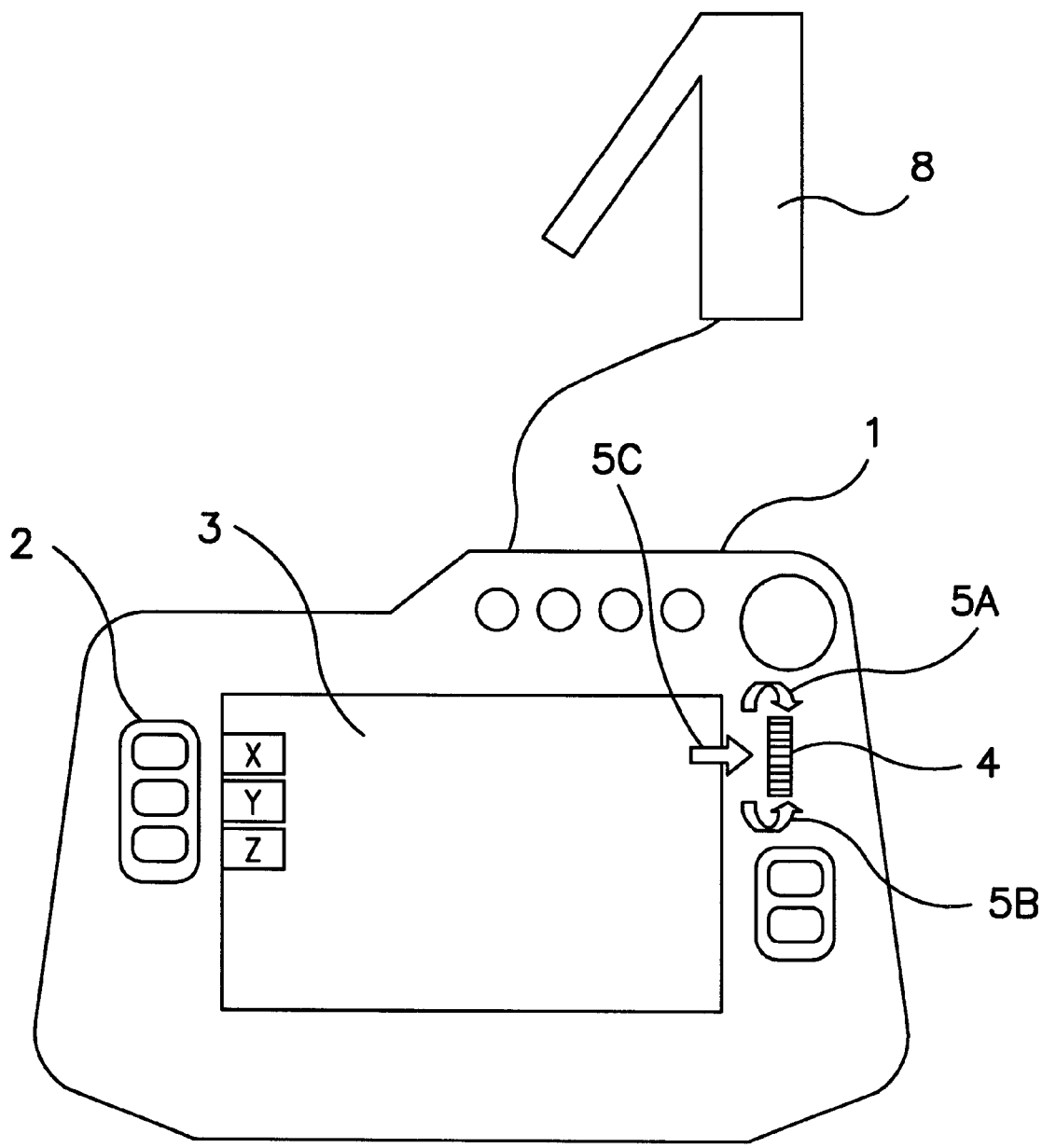
FIG. 1 is an outside drawing of a teaching device for robots in an embodiment of the present invention.

1 Teaching device (teaching pendant)
2 Operation key
3 Display
4 Jog dial (controller)
4a Rotary encoder (rotation detector)
4b Dial
4c Ever-open type switch (pressure detector)
5A, 5B, 5C Arrows showing the manipulating directions of dial 4b
8 Robot section, robot arm

DETAILED DESCRIPTION OF THE INVENTION

A teaching device for robots in an embodiment of the present invention is a teaching device for robots, which serves to set the operating position and speed of a robot arm having a plurality of operation coordinates.

The teaching device comprises (a) a plurality of operation keys which designate one of the plurality of operation coordinates of the robot arm, and (b) a controller which controls the operation of the robot arm, wherein the controller has a function to control the robot arm so that the robot arm is positioned on the designated operation coordinate, and also a function to control the operation speed of the robot arm.

The controller comprises a jog dial disposed in a manner such that the jog dial can be either pushed or pulled at least and rotated, wherein, (i) when the jog dial is rotated in a state that the jog dial is neither pushed nor pulled, the position of the robot arm is controlled by the rotation of the jog dial, and when the jog dial is rotated in a state that the jog dial is either pushed or pulled at least, the operation speed of the robot arm is controlled by the rotation of the jog dial.

Preferably, the controller comprises a rotation detector which detects the rotated state of the jog dial, a pressure detector which detects the pushed state of the jog dial, and a judging means, wherein, (i) the judging means receives the input signal from the rotation detector and pressure detector, and when the jog dial is rotated in a state that the jog dial is neither pushed nor pulled, the signal from the rotation detector and pressure detector is judged to be a signal for designating the position of the robot arm, and when the jog dial is rotated in a state that the jog dial is either pushed or pulled at least, the signal from the rotation detector and pressure detector is judged to be a signal for designating the operation speed of the robot arm.

The teaching device serves to set the operation position and speed of the robot arm. An operation permit key serves to permit the operation of the robot arm. An operation key designates one of the operation coordinates of the robot arm. The jog dial is disposed in the teaching device in a manner such that the jog dial can be freely pushed or pulled and rotated. The jog dial is rotated to adjust the operation of the robot arm on the designated operation coordinate. The rotation detector detects the rotated state of the jog dial. The pressure detector detects the pushed or pulled state of the jog dial. The judging means, receiving the signal from the rotation detector and pressure detector, judges the signal to be a signal for designating the position of the robot arm when the jog dial is rotated in a state of being neither pushed nor pulled, and also judges the signal to be a signal for designating the operation speed of the robot arm when the jog dial is rotated in a state of being either pushed or pulled.

Preferably, the pressure detector has an ever-open type switch.

Preferably, the teaching device further comprises (c) an operation permit key which permits the operation of the robot arm.

Preferably, when the plurality of operation keys are not manipulated at all, the display 3 shows a menu based upon the signal from the rotation detector 4a (FIG. 2), and the displayed menu is selectively designated.

Preferably, the operation permit key also serves as the operation key.

Preferably, the operation key includes an ever-open type switch.

Preferably, the teaching device further comprises (d) a display 3 (FIG. 2) and (e) a driving means 12 (FIG. 2) to drive the display 3, wherein the operation coordinate corresponding to the operation key is shown on the display surface.

Preferably, when the plurality of operation keys are not manipulated at all, the display 3 shows a menu based upon the signal from the rotation detector 4a (FIG. 2), and the displayed menu is selectively designated.

Preferably the selectively designated menu is decided by the signal from the pressure detector.

Preferably, the plurality of operation coordinates include at least one of the following:
(i) orthogonal coordinates having X axis, Y axis, Z axis; and
(ii) cylindrical coordinates having R, θ, Z axis.

Preferably, the jog dial rotates clockwise and counterclockwise, and the moving direction of the robot arm is controlled by selecting the rotating direction of the jog dial.

Preferably, the moving speed of the robot arm is controlled by regulating the extent of rotation control of the jog dial.

Preferably, the jog dial includes a plurality of click means, and each click of the plurality of click means outputs the preset moving amount of the robot arm. When the jog dial is rotated by one click, the robot arm makes a move by the preset moving amount.

A robot in one embodiment of the present invention comprises a robot arm and the above-mentioned teaching device.

A robot operating method of the present invention comprises:
(a) a step of manipulating one operation key out of a plurality of operation keys and selecting the operation coordinates of a robot arm; and
(b) a step of controlling the position of the robot arm by rotating a jog dial in a state that the jog dial is neither pushed nor pulled, a step of controlling the operation speed of the robot arm by rotating the jog dial in a state that the jog dial is either pushed or pulled at least, and a step of moving the robot arm to the predetermined position,
wherein the robot arm may be continuously operated and positioned by manipulating the jog dial.

Preferably, a controller comprises:
a rotation detector which detects the rotated state of the jog dial, and a pressure detector which detects the pushed or pulled state of the jog dial, wherein the signal from the rotation detector and the pressure detector is judged to be a signal for designating the position of the robot arm when the jog dial is rotated in a state that the jog dial is neither pushed nor pulled, and also judged to be a signal for designating the operation speed of the robot arm when the jog dial is rotated in a state that the jog dial is either pushed or pulled.

Preferably, a plurality of operation coordinates include at least one of the following:

(i) orthogonal coordinates having X axis, Y axis, Z axis;

(ii) cylindrical coordinates having R, θ, Z axis; and the robot arm moves on one of the coordinates.

Preferably, the jog dial rotates clockwise and counterclockwise, and the moving direction of the robot arm is controlled by selecting the rotating direction of the jog dial.

Preferably, the moving speed of the robot arm is controlled by regulating the extent of rotation control of the jog dial.

Preferably, the jog dial includes a plurality of click means, and each click of the plurality of click means outputs the preset moving amount of the robot arm, and when the jog dial is rotated by one click, the robot arm makes a move by the preset moving amount.

Preferably, the teaching device further comprises a display and a driving means to drive the display, wherein the operation coordinate corresponding to the operation key is shown on the display surface.

Preferably, when the plurality of operation keys are not manipulated at all, the display shows a menu based upon the signal from the rotation detector, and the operating method further comprises (c) a step of selecting the jog dial in order to select from the displayed menu.

Preferably, the selected and designated menu is decided by the signal from the pressure detector.

In the above configuration, the operator is able to designate one of the operation coordinates of the robot arm by either pushing or pulling the operation key and to directly adjust the operational position on the designated operation coordinates by rotating the jog dial. Further, the operator is able to directly adjust the operation speed of the robot arm on the designated operation coordinates by rotating the jog dial while pushing or pulling same. Therefore, the robot operations ranging from delicate positioning to high-speed continuous operation can be readily controlled by these serial manipulations. That is, the number of operation keys can be decreased, making it possible to realize cost reduction and also to miniaturize the teaching device. Further, the working efficiency and the operational safety may be considerably enhanced. In addition, it is possible to readily control the operations of the robot ranging from delicate positioning to high-speed continuous operation by serial manipulations. As a result, the working efficiency and the operational safety can be greatly improved.

In place of the above configuration, it is also possible to use a configuration as shown in the following.

In a teaching device for robots, (ii) when the jog dial is rotated in a state that the jog dial is neither pushed nor pulled, the operation speed of the robot arm is controlled by the rotation of the jog dial, and when the jog dial is rotated in a state that the jog dial is either pushed or pulled, the position of the robot arm is controlled by the rotation of the jog dial.

Or, (ii) the judging means receives the input signal from the rotation detector and pressure detector, and when the jog dial is rotated in a state that the jog dial is neither pushed nor pulled, the signal is judged to be a signal for designating the position of the robot arm, and when the jog dial is rotated in a state that the jog dial is either pushed or pulled, the signal is judged to be a signal for designating the operation speed of the robot arm.

Also, the robot operating method comprises (ii) a step of controlling the operation speed of the robot arm by rotating the jog dial in a state that the jog dial is neither pushed nor pulled, and a step of controlling the position of the robot arm by rotating the jog dial in a state that the jog dial is either pushed or pulled.

With this configuration, the same advantages as described above will also be obtained. That is, the number of operation keys can be decreased, making it possible to realize cost reduction and also to minimize the teaching device. Further, the working efficiency and the operational safety may be considerably enhanced. In addition, it is possible to readily control the operations of the robot ranging from delicate positioning to high-speed continuous operation by serial manipulations. As a result, the working efficiency and the operational safety can be greatly improved.

An exemplary embodiment of the present invention will be described in the following.

Exemplary Embodiment 1

FIG. 1 shows an embodiment of a teaching device (teaching pendant) for robots of the present invention.

In FIG. 1, teaching pendant 1 is electrically connected to robot 8. There are provided a plurality of operation keys 2 at the left side of the teaching pendant 1. The plurality of operation keys 2 include operation keys which are same in number to the degree of freedom of movement of the robot, and in the present example are shown the degrees of freedom in three operational directions, X axis, Y axis, and Z axis.

The plurality of operation keys 2 also serve a function as an operation permit key. That is, the operation keys 2 are provided with a function as an operation permit key to prevent the robot from operating with an operation button pressed by mistake at the same time when designating the operational direction. As an operation key to serve these respective functions, an ever-open type switch is employed.

Also, the operation key 2 is a function key. The direction and the content of operation against each operation key 2 are given on display 3. When the intention of the operation key 2 has been changed by other instruction, for example, with the orthogonal coordinates designated, the letters "X, Y, Z" will appear on the display. Or, with the cylindrical coordinates designated, the letters displayed will change to "R, θ, Z." Thus, the operator is able to understand what the key means.

At the right side of teaching pendant 1 is disposed a controller. The controller has a jog dial 4.

The structure and action of the controller are described with reference to the illustrative drawing of FIG. 2.

Figure 2:
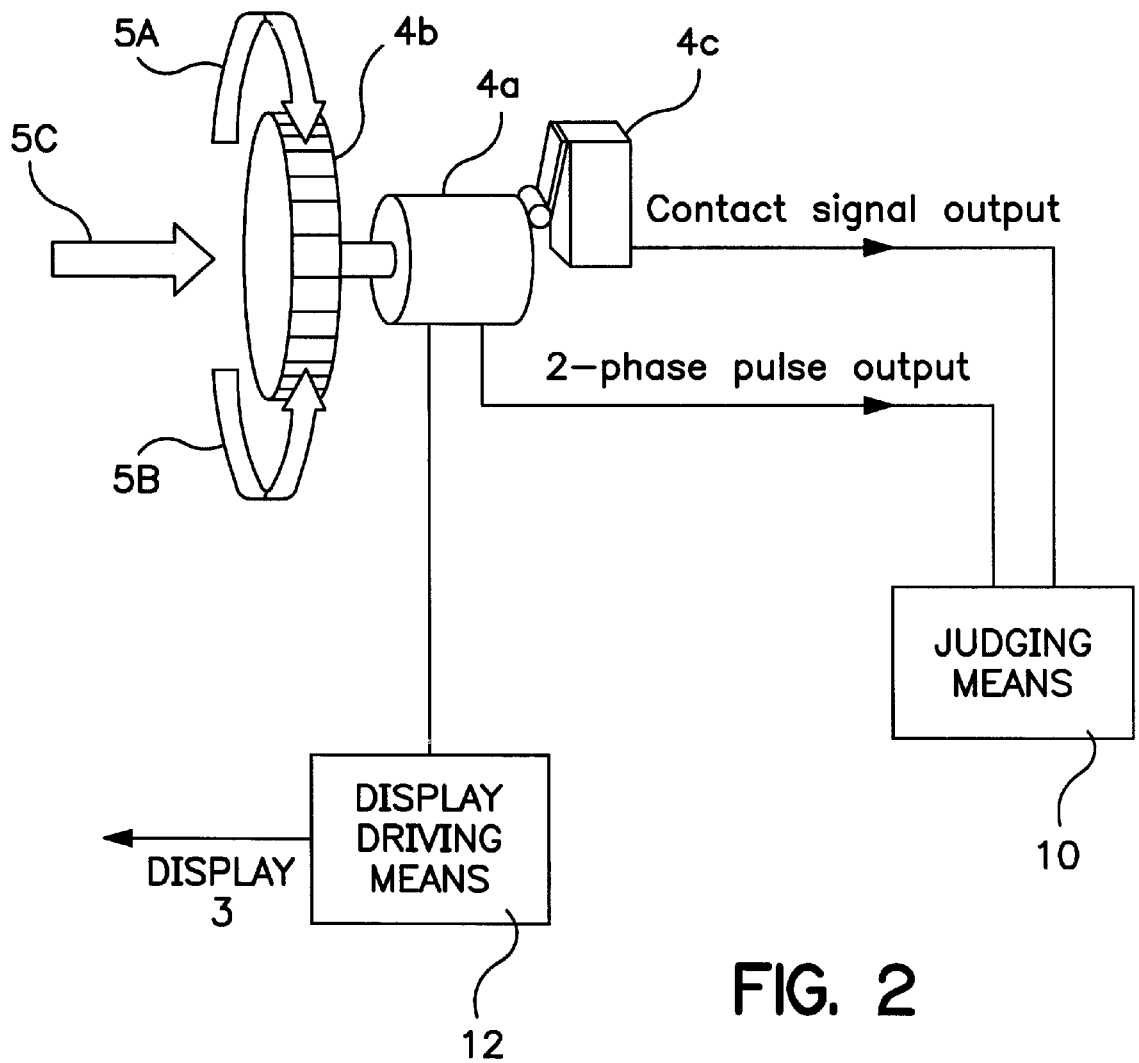
FIG. 2 is an illustrative drawing that shows the structure of a jog dial installed in the teaching device of FIG. 1.

In FIG. 2 the controller includes jog dial 4 and judging means 10. The jog dial 4 comprises manipulator 4b, rotation detector 4a, and pressure detector 4c. The manipulator has a disk-shaped dial 4b. The rotation detector has a rotary encoder 4a. The pressure detector 4c has an ever-open type switch. The dial 4b is attached to the rotary shaft of rotary encoder 4a. The dial 4b forms a click means which regulates the rotational position at predetermined intervals. The click means includes a plurality of clicks. The judging means 10 includes a counter and a direction checker.

When the dial 4b is rotated in the direction of arrow 5A or 5B, the rotary encoder 4a outputs two-phase pulses with a phase difference of about 90° every clicking of the click means.

The two-phase pulses are counted by the counter and further processed by the direction checker. With this configuration, the rotating amount of the dial 4b is detected, and the direction of arrow 5A or 5B is detected, in which the dial 4b is rotated. That is, the rotating direction and rotating amount of the dial are detected.

The controller serves the following functions. When the ever-open type switch 4c is actuated, the controller controls the robot so that the robot starts to operate in a continuous mode. The normal and reverse directions of the robot operation are changed over by selecting the rotating direction (arrow 5A or 5B) of the jog dial 4. The operation speed of the robot is controlled according to the rotating amount of the jog dial 4. The relationship between the rotating amount of jog dial 4 and the operation speed of the robot is preferable to be nearly in direct proportion to each other. However, the relationship between the rotating amount of jog dial 4 and the operation speed of the robot is not always necessary to be in direct proportion to each other, but it is possible to make optional setting.

Also, the movement of dial 4b in the direction of arrow 5C is transmitted to the ever-open type switch 4c. When the dial 4b is moved in the direction of arrow 5C, the ever-open type switch 4c is actuated.

The operation of the robot by using the teaching pendant 1 in the above configuration will be described by using FIG. 1 in accordance with the operator's manipulation procedure.

First, the operating method for roughly adjusting the position of the robot in a continuous operation mode will be described.

The operator selects an operation key 2 corresponding to the desired moving direction of the robot and then pushes the key by using the left hand. For example, an operation key corresponding to one of X, Y, Z is pushed.

In this case, when the jog dial 4 is pushed in the direction of arrow 5C, the ever-open type switch 4c is actuated.

Next, the operator rotates the jog dial 4 in the direction of arrow 5A or 5B as desired while pressing down the jog dial 4 in the direction of arrow 5C by using the right hand. In this way, the robot will move to the desired position at the desired speed. That is, when the rotating amount of dial 4b is greater, the robot moves at a higher speed. Contrarily, when the rotating amount of dial 4b is less, the robot moves at a lower speed.

Accordingly, the operator is not required to frequently change the operation speed of the robot, and is able to easily control the moving direction and speed of the robot. Therefore, the operator hardly makes mistakes in operation, and is able to perform the work safely and efficiently.

Also, it is possible to use a configuration in which the jog dial 4 includes a response setter. By adjusting the response setting, it is possible to improve the feeling in manipulation for the convenience of the operator.

Preferably, the jog dial 4 has a structure such that the operator feels a certain dead zone when rotating the dial 4b. Thus, when the operator rotates the dial 4b in the direction of arrow 5A or 5B while pushing the jog dial 4 in the direction of arrow 5C, the robot is prevented from moving in the direction not intended by the operator when the jog dial 4 is pushed in the direction of arrow 5C.

Preferably, the controller is operated so that the speed reducing operation is faster than the speed increasing operation. Accordingly, the movement of the robot includes a hysteresis, and the operator will have a sense of security.

After rotating the dial, turning it back to the original position will gradually lower the operation speed of the robot until the robot stops moving.

Also, when the operator is manipulating the operation key 2 by the left hand or the jog dial 4 by the right hand, removing the hand from the key or dial will quickly stop the operation of the robot.

Since both of the operation key 2 and the switch mechanism pushed in the direction of arrow 5C of the jog dial 4 serve a function as an ever-open type switch, operational safety may be assured, for instance, in terms of circuits.

Next, the delicate adjustment of the robot position in pitch operation will be described in the following.

The jog dial 4 forms a click means which regulates the rotational position at predetermined intervals. The click means includes a plurality of clicks. Pulse output is given every clicking of the click means. The moving amount of the robot is previously set every output of the respective pulses. For example, the controller is set so that the rotating amount of jog dial 4 is directly proportional to the moving amount of the robot.

Same as in the above continuous operation, while selecting an operation key 2 corresponding to the desired moving direction of the robot and pressing down the key by the left hand, the operator rotates the jog dial 4 by the right hand in the direction of arrow 5A or 5B, either normal or reverse direction, without pushing the jog dial 4 in the direction of arrow 5C. In this way, the operator rotates the jog dial to the desired click position.

Thus, making the rotating amount of jog dial 4 directly proportional to the moving amount of robot, the robot can be easily and accurately moved to the desired position.

Also, by rotating the jog dial 4 rapidly, the robot can be moved several millimeters in distance to the target position in a relatively short time.

In this way, the robot can be moved to the predetermined position in a short time without changing over the moving amount of the robot. As a result, the working efficiency will be greatly improved.

Further, in the present exemplary embodiment, continuous operation in which rough positioning is made and pitch operation in which delicate positioning is made can be performed as a series of operations without interruption. Further, each of these operations is very easy for the operator to perform.

Also, in the present exemplary embodiment, the normal and reverse directions can be selected by selecting the rotating direction of the jog dial. Therefore, it is not necessary to install two keys for selecting the normal and reverse directions of respective operations. Further, the teaching device of the present exemplary embodiment does not require so many keys as is required in the prior art such as a speed change key for continuous operation, moving amount changeover key for pitch operation, and mode selector key for continuous or pitch operation, or the like, and thereby, the number of keys can be considerably reduced. As a result, cost reduction and miniaturization of the teaching pendant can be realized.

In the above exemplary embodiment, the controller has a configuration such that (i) when the jog dial is rotated in a state that the jog dial is not pushed, the position of the robot arm is controlled by the rotation of the jog dial, and when the jog dial is rotated in a state that the jog dial is pushed, the speed of the robot arm is controlled by the rotation of the jog dial. However, the controller is not limited to this configuration, but it is possible for the controller to have a configuration such that (ii) when the jog dial is rotated in a state that the jog dial is not pushed, the operation speed of the robot arm is controlled by the rotation of the jog dial, and when the jog dial is rotated in a state that the jog dial is pushed, the position of the robot arm is controlled by the rotation of the jog dial. With this configuration, the same advantages as mentioned above will be obtained. However, the above configuration (i) will bring about more excellent advantages as compared to the configuration (ii).

Also, in the present exemplary embodiment, when the jog dial 4 is individually manipulated without being used together with the operation key 2, the jog dial 4 may serve a completely different function, apart from manipulation for robot operation.

For example, the display 3 has a function to display various menus. The jog dial 4 when rotated serves a function as a cursor shift key or screen scroll key to select various instructions from the menu shown by the display 3. And, the jog dial 4 when pushed serves a function as a key to select and execute instructions. In addition to a function to actually operate the robot, the jog dial 4 serves a function to perform operations such as filing, setting, program editing, etc. Thus, the number of operation keys can be reduced, and the workability will be improved.

Exemplary Embodiment 2

In the above exemplary embodiment 1, the configuration provides a function such that the jog dial 4 can be pushed in, but it is not limited only to this configuration. It is also possible to provide a function such that the jog dial 4 can be pulled.

That is, when the jog dial is rotated in a state that the jog dial is not pulled, the position of the robot arm can be controlled by the rotation of the jog dial, and when the jog dial is rotated in a state that the jog dial is pulled, the operation speed of the robot arm can be controlled by the rotation of the jog dial.

Also, the controller comprises a rotation detector which detects the rotated state of the jog dial, a pressure detector which detects the pushed state of the jog dial, and a judging means.

The judging means 10 (FIG. 2) receives the input signal from the rotation detector 4a and pressure detector 4c, and when the jog dial 4b is rotated in a state that the jog dial 4b is not pulled, the signal from the rotation detector 4a and pressure detector 4c is judged to be a signal for designating the position of the robot arm 8 (FIG. 1), and when the jog dial 4b is rotated in a state that the jog dial 4b is pulled, the signal from the rotation detector 4a and pressure detector 4c is judged to be a signal for designating the operation speed of the robot arm.

Another configuration of the present exemplary embodiment 2 is same as in the above exemplary embodiment 1. With the configuration, nearly the same advantages as in the exemplary embodiment 1 can be obtained. However, the configuration providing a function such that the jog dial 4 can be pushed in will bring about more excellent workability as compared to the configuration providing a function such that the jog dial 4 can be pulled. That is, the configuration having a function such that the jog dial 4 can be pushed in is more preferable than the configuration having a function such that the jog dial 4 can be pulled.

Incidentally, in the present invention, the term "robot" has same meaning as "robot sections" or "robot arm."

As described above, by the present invention, the number of operation keys can be considerably decreased. Accordingly, cost reduction can be realized. Further, the teaching device can be miniaturized. Moreover, the operations of the robot ranging from delicate positioning to high-speed continuous operation can be readily controlled by serial manipulations. As a result, the working efficiency and safety will be greatly enhanced.

What is claimed is:

1. A teaching device for a robot, which serves to set the operating position and speed of a robot arm having a plurality of operation coordinates, comprising:
   (a) a plurality of operation keys which designate one out of the plurality of operation coordinates of said robot arm; and
   (b) a controller which controls the operation of said robot arm,
      said controller having a function to control said robot arm so that said robot arm is positioned on the designated operation coordinate, and a function to control the operation speed of said robot arm;
      said controller comprising a jog dial disposed in a manner such that said jog dial can be either pushed or pulled and rotated;
      wherein said robot arm performs at least one operation of:
         (i) when said jog dial is rotated in a state that said jog dial is neither pushed nor pulled, the position of said robot arm is controlled by the rotation of said jog dial, and
         when said jog dial is rotated in a state that said jog dial is either pushed or pulled, the operation speed of said robot arm is controlled by the rotation of said jog dial, and
         (ii) when said jog dial is rotated in a state that said jog dial is neither pushed nor pulled, the operation speed of said robot arm is controlled by the rotation of said jog dial, and
         when said jog dial is rotated in a state that said jog dial is either pushed or pulled, the position of said robot arm is controlled by the rotation of said jog dial.

2. The teaching device for robots of claim 1, wherein said controller comprises
   a rotation detector which detects the rotated state of said jog dial;
   a pressure detector which detects at least one of the pushed and pulled states of said jog dial; and
   a judging means,
   wherein said judging means receives a signal from said rotation detector and pressure detector, and
   said judging means judges the signal as one of
      (i) when said jog dial is rotated in a state that said jog dial is neither pushed nor pulled, the signal is judged to be a signal for designating the position of said robot arm, and
      when said jog dial is rotated in a state that said jog dial is either pushed or pulled at least, the signal is judged to be a signal for designating the operation speed of said robot arm, and
      (ii) when said jog dial is rotated in a state that said jog dial is neither pushed nor pulled, the signal is judged to be a signal for designating the operation speed of said robot arm, and
      when said jog dial is rotated in a state that said jog dial is either pushed or pulled at least, the signal is judged to be a signal for designating the position of said robot arm.

3. The teaching device of claim 1,
   wherein when said jog dial is rotated in a state that said jog dial is not pushed, the position of said robot arm is controlled by the rotation of said jog dial, and when said jog dial is rotated in a state that said jog dial is pushed, the operation speed of said robot arm is controlled by the rotation of said jog dial, and wherein said controller comprises a rotation detector which detects the rotated state of said jog dial, a pressure detector which detects the pushed state of said jog dial, and a judging means, wherein said judging means receives a signal from said rotation detector and pressure detector, and when said jog dial is rotated in a state that said jog dial is not pushed, the signal is judged to be a signal for designating the position of said robot arm, and when said jog dial is rotated in a state that said jog dial is pushed, the signal is judged to be a signal for designating the operation speed of said robot arm.

4. The teaching device for robots of claim 2, wherein said pressure detector includes an ever-open type switch.

5. The teaching device for robots of claim 1, further comprising:

(c) an operation permit key which permits the operation of said robot arm.

6. The teaching device for robots of claim 5, wherein said operation permit key also serves as said operation key.

7. The teaching device for robots of claim 1, wherein said operation key includes an ever-open type.

8. The teaching device for robots of claim 5, further comprising:

(d) a display;

(e) a driving means to drive said display, wherein operation coordinate corresponding to said operation key is shown on said display.

9. The teaching device for robots of claim 8, wherein when the operation keys are not manipulated at all, said display shows a menu based upon the signal from said rotation detector, and the displayed menu is selectively designated.

10. The teaching device for robots of claim 9, wherein the selectively designated menu is decided by the signal from said pressure detector.

11. The teaching device for robots of claim 2, wherein a plurality of operation coordinates include at least one of:

(i) orthogonal coordinates having X axis, Y axis, Z axis; and (ii) cylindrical coordinates having R, θ, Z axis.

12. The teaching device for robots of claim 2, wherein said jog dial rotates clockwise and counterclockwise, and the moving direction of said robot arm is controlled by the rotating direction of said jog dial.

13. The teaching device for robots of claim 2, wherein the moving speed of said robot arm is controlled by regulating the extent of rotation of said jog dial.

14. The teaching device for robots of claim 2, wherein said jog dial includes a plurality of click means, each click of the plurality of click means outputs the preset moving amount of said robot arm, and when said jog dial is rotated by one click, said robot arm makes a move by the preset moving amount.

15. A robot, comprising:

a robot arm, and a teaching device for the robot, which serves to set the operating position and speed of the robot arm having a plurality of operation coordinates, the teaching device including, (a) a plurality of operation keys which designate one out of the plurality of operation coordinates of said robot arm; and (b) a controller which controls the operation of said robot arm, said controller having a function to control said robot arm so that said robot arm is positioned on the designated operation coordinate, and a function to control the operation speed of said robot arm;

said controller comprising a jog dial disposed in a manner such that said jog dial can be either pushed or pulled and rotated;

wherein said robot arm performs at least one operation of:

(i) when said jog dial is rotated in a state that said jog dial is neither pushed nor pulled, the position of said robot arm is controlled by the rotation of said jog dial, and when said jog dial is rotated in a state that said jog dial is either pushed or pulled at least, the operation speed of said robot arm is controlled by the rotation of said jog dial, and (ii) when said jog dial is rotated in a state that said jog dial is neither pushed nor pulled, the operation speed of said robot arm is controlled by the rotation of said jog dial, and when said jog dial is rotated in a state that said jog dial is either pushed or pulled at least, the position of said robot arm is controlled by the rotation of said jog dial.

16. The robot of claim 15, wherein said controller comprises a rotation detector which detects the rotated state of said jog dial, and a pressure detector which detects at least one of the pushed and pulled states of said jog dial, wherein a signal from said rotation detector and pressure detector is judged as follows:

(i) when said jog dial is rotated in a state that said jog dial is neither pushed nor pulled, the signal is judged to be a signal for designating the position of said robot arm, and when said jog dial is rotated in a state that said jog dial is either pushed or pulled at least, the signal is judged to be a signal for designating the operation speed of said robot arm, or (ii) when said jog dial is rotated in a state that said jog dial is neither pushed nor pulled, the signal is judged to be a signal for designating the operation speed of said robot arm, and when said jog dial is rotated in a state that said jog dial is either pushed or pulled at least, the signal is judged to be a signal for designating the position of said robot arm.

17. A robot operating method, which is a method of operating a robot equipped with a teaching device and a robot arm, said teaching device comprising a controller having a jog dial and a plurality of operation keys, said robot arm moving on a plurality of operation coordinates, said operating method comprises the steps of:

(a) selecting and manipulating one operation key out of a plurality of operation keys, and selecting the operation coordinates of said robot arm, and (b) moving said robot arm to the predetermined position through one step of
  (i) controlling the position of said robot arm by rotating said jog dial in a state that said jog dial is neither pushed nor pulled, and controlling the operation speed of said robot arm by rotating said jog dial in a state that said jog dial is either pushed or pulled at least,
  (ii) controlling the operation speed of said robot arm by rotating said jog dial in a state that said jog dial is neither pushed nor pulled, and controlling the position of said robot arm by rotating said jog dial in a state that said jog dial is either pushed or pulled at least,
wherein said robot arm may be continuously operated and positioned by manipulating said jog dial.

18. The robot operating method of claim 17,
wherein said controller comprises
  a rotation detector which detects the rotated state of said jog dial, and
  a pressure detector which detects the pushed state of said jog dial,
  wherein a signal from said rotation detector and pressure detector is judged as follows:
    (i) when said jog dial is rotated in a state that said jog dial is neither pushed nor pulled, the signal is judged to be a signal for designating the position of said robot arm, and
    when said jog dial is rotated in a state that said jog dial is either pushed or pulled at least, the signal is judged to be a signal for designating the operation speed of said robot arm, or
    (ii) when said jog dial is rotated in a state that said jog dial is neither pushed nor pulled, the signal is judged to be a signal for designating the operation speed of said robot arm, and
    when said jog dial is rotated in a state that said jog dial is either pushed or pulled at least, the signal is judged to be a signal for designating the position of said robot arm.

19. The robot operating method of claim 17,
wherein said plurality of coordinates include at least one of
  (i) orthogonal coordinates having X axis, Y axis, Z axis, and
  (ii) cylindrical coordinates having R, θ, Z axis,
wherein said robot arm moves on one of the operation coordinates.

20. The robot operating method of claim 17,
wherein said jog dial rotates clockwise and counterclockwise, and the moving direction of said robot arm is controlled by the rotating direction of said jog dial.

21. The robot operating method of claim 17,
wherein the moving speed of said robot arm is controlled by regulating the extent of rotation of said jog dial.

22. The robot operating method of claim 17,
wherein said jog dial includes a plurality of click means,
providing each click of the plurality of click means to output the preset moving amount of said robot arm, and
rotating said jog dial by one click and said robot arm makes a move by the preset moving amount.

23. The robot operating method of claim 17,
wherein said teaching device further comprises a display and a driving means,
driving said display by said driving means, and
providing the operation coordinate corresponding to said operation key to appear on said display.

24. The robot operating method of claim 18,
displaying on said display a menu based upon the signal from said rotation detector when said plurality of operation keys are not manipulated, and
operating said jog dial in order to select from the displayed menu.

25. The robot operating method of claim 24,
wherein the selectively designated menu is decided by the signal from said pressure detector.

26. The robot operating method of claim 17,
wherein said controller comprises
  a rotation detector which detects the rotated state of said jog dial, and
  a pressure detector which detects the pushed stated of said jog dial,
  wherein the step (b) includes:
    a step of controlling the position of said robot arm by rotating said jog dial in a state that said jog dial is not pushed, and
    a step of controlling the operation speed of said robot arm by rotating said jog dial in a state that said jog dial is pushed,
  wherein the signal from said rotation detector and pressure detector is judged as follows:
    when said jog dial is rotated in a state that said jog dial is not pushed, the signal is judged to be a signal for designating the position of said robot arm, and
    when said jog dial is rotated in a state that said jog dial is not pushed, the signal is judged to be a signal for designating the operation speed of said robot arm.

* * * * *

UNITED STATES PATENT AND TRADEMARK OFFICE
CERTIFICATE OF CORRECTION

PATENT NO.    : 6,462,499 B2
DATED         : October 8, 2002
INVENTOR(S)   : Yasushi Mukai It is certified that error appears in the above-identified patent and that said Letters Patent is hereby corrected as shown below:

<u>Column 11,</u>
Line 30, after "an ever-open type", insert -- switch --.

<u>Column 14,</u>
Line 48, delete "dial is not pushed," and insert -- dial is pushed, --.

Signed and Sealed this

Twenty-seventh Day of May, 2003

JAMES E. ROGAN
*Director of the United States Patent and Trademark Office*